United States Patent
Bao et al.

(10) Patent No.: US 7,386,417 B1
(45) Date of Patent: Jun. 10, 2008

(54) METHOD AND APPARATUS FOR CLUSTERING TELEMETRY SIGNALS TO FACILITATE COMPUTER SYSTEM MONITORING

(75) Inventors: Yujuan Bao, Beijing (CN); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 673 days.

(21) Appl. No.: 10/955,194

(22) Filed: Sep. 29, 2004

(51) Int. Cl.
*G06F 15/00* (2006.01)

(52) U.S. Cl. .................. 702/179; 702/180; 702/181; 702/187; 702/189; 375/343

(58) Field of Classification Search .............. 702/71, 702/72, 179–187, 189; 700/9, 47, 48; 455/18, 455/20, 344, 355; 714/47, 48; 708/313; 375/343
See application file for complete search history.

(56) References Cited

U.S. PATENT DOCUMENTS

| 4,937,763 | A | | 6/1990 | Mott .......................... 364/550 |
| 5,774,379 | A | * | 6/1998 | Gross et al. .................. 702/72 |
| 7,035,240 | B1 | * | 4/2006 | Balakrishnan et al. ...... 370/338 |
| 2002/0161763 | A1 | * | 10/2002 | Ye et al. ........................ 707/7 |

* cited by examiner

Primary Examiner—Eliseo Ramos-Feliciano
Assistant Examiner—Phuong Huynh
(74) Attorney, Agent, or Firm—Park, Vaughan & Fleming LLP; Shun Yao (57) ABSTRACT

One embodiment of the present invention provides a system that facilitates computer system monitoring. During operation, the system receives monitored signals from a computer system. The system then computes cross-correlation coefficients between the signals. Next, the system groups the signals into clusters based on the cross-correlation coefficients, wherein signals within a cluster are closely correlated. The system also monitors signals within each cluster, and checks cross correlations between signals within each cluster to identify computer system anomalies.

24 Claims, 8 Drawing Sheets

METHOD AND APPARATUS FOR CLUSTERING TELEMETRY SIGNALS TO FACILITATE COMPUTER SYSTEM MONITORING

BACKGROUND

1. Field of the Invention

The present invention relates to techniques for enhancing the reliability of computer systems. More specifically, the present invention relates to a method and an apparatus for efficiently clustering telemetry signals within a computer system to facilitate computer system monitoring.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability in enterprise computing systems, it is necessary to be able to capture unambiguous diagnostic information that can quickly pinpoint the source of defects in hardware or software. If systems have too little event monitoring, when problems crop up at a customer site, service engineers may be unable to quickly identify the source of the problem. This can lead to increased down time, which can adversely impact customer satisfaction and loyalty.

Fortunately, high-end computer servers, such as those manufactured by SUN Microsystems, Inc. of Santa Clara, Calif., are now equipped with over 1000 sensors that measure variables such as temperature, voltage, current, vibration, and acoustics. Software-based monitoring mechanisms also monitor system performance parameters, such as processor load, memory and cache usage, system throughput, queue lengths, I/O traffic, and quality of service. For example, SUN's telemetry harness collects over 25,000 soft variables in real time.

However, it is neither feasible nor desirable to build a pattern recognition engine to monitor as many as 25,000 variables concurrently. This is because, in general, not all the signals are correlated with each other, and the computational costs associated with analyzing so many signals concurrently is prohibitively high.

Among all the collected variables, many signals are entirely uncorrelated with each other. On the other hand, there are clusters of signals among which there is a high degree of correlation. Since signals from disparate clusters are not closely correlated, pattern recognition mechanisms, which derive information from correlations between signals, perform poorly if fed streams of data from uncorrelated signals.

Furthermore, the computational complexity of pattern recognition increases quadratically with the number of monitored signals. A system can, therefore, substantially reduce computational costs by dividing the colleted signals into clusters and by monitoring each cluster separately.

Moreover, monitored signals often have time-varying phase shifts with respect to each other. These time-varying phase shifts are associated with the "speeding up" and "slowing down" of individual processes. Such dynamic phase changes may interfere with the processes of clustering and monitoring telemetry signals from a computer system.

Hence, what is needed is a method and an apparatus for efficiently clustering a large number of telemetry signals to facilitate accurate and efficient computer system monitoring.

SUMMARY

One embodiment of the present invention provides a system that facilitates computer system monitoring. During operation, the system receives monitored signals from a computer system. The system then computes cross-correlation coefficients between the signals. Next, the system groups the signals into clusters based on the cross-correlation coefficients, wherein signals within a cluster are closely correlated. The system also monitors signals within each cluster, and checks cross correlations between signals within each cluster to identify computer system anomalies.

In a variation of this embodiment, computing a cross-correlation coefficient between a first signal and a second signal involves maximizing the cross-correlation coefficient with respect to the relative phase shift between the first signal and second signal by fixing the first signal, and by generating a phase shift for the second signal so that the cross correlation between the first signal and the second signal is substantially maximized.

In a further variation, generating a phase shift for the second signal involves: imposing different phase shifts on the second signal; determining the cross-correlation coefficients between the first signal and the second signal at the different phase shifts; interpolating the cross-correlation coefficients with respect to the phase shift for the second signal; and finding the phase-shift value that corresponds to a substantially maximized cross-correlation coefficient.

In a further variation, interpolating the cross-correlation coefficient involves performing a Lagrangian interpolation. In addition, finding the phase-shift value corresponding to the substantially maximized cross-correlation coefficient involves computing a derivative of the interpolated cross-correlation coefficient with respect to the phase shift of the second signal, and finding a phase-shift value which produces a substantially zero-valued derivative.

In a variation of this embodiment, grouping the signals into clusters involves forming a spanning-tree graph for each cluster of closely correlated signals; wherein each node in a graph represents a signal; wherein each edge in a graph represents a correlation between two signals; wherein the weight on an edge represents a substantially maximized cross-correlation coefficient between two signals; and wherein the substantially maximized cross-correlation coefficients represented by the weights of edges in each spanning-tree graph are greater than or equal to a threshold.

In a further variation, while forming a spanning-tree graph for each cluster of closely correlated signals, the system constructs a complete graph in which each node represents a signal. The system then assigns a weight to each edge of the complete graph, wherein the weight corresponds to a substantially maximized cross-correlation coefficient between the two signals represented by the nodes connected by the edge. The system also marks each edge as "free," and iteratively selects among the "free" edges the edge with the highest weight and whose weight is greater than or equal to the threshold. If adding the selected edge to a group of edges which comprise one or more spanning tree graphs does not result in a cycle, the system adds the selected edge to the group and marks the selected edge as "taken." Otherwise, the system marks this selected edge as "throwaway" and discards this selected edge. The system stops the iterative selection process if all the "free" edges have weights less than the threshold.

In a variation of this embodiment, the system synchronizes the timing of all the signals within one cluster.

In a further variation, the system forms a tree graph for each cluster; wherein each node represents a signal; and wherein each edge represents the correlation between two signals. Synchronizing the timing of all the signals within one cluster involves synchronizing the timing of the signal represented by each node with the timing of the signal represented by the node's parent, except for the signal represented by the root node.

In a further variation, synchronizing the timing of the signal represented by each node with the timing of the signal represented the node's parent involves traversing the spanning tree graph in a breadth-first manner or in a depth-first manner.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

One embodiment of the present invention relates to an advanced system for monitoring continuous telemetry signals from a computer system. When used with advanced pattern recognition techniques, such a monitoring system can provide predictive failure warnings and can eliminate mechanisms responsible for costly No Trouble Found (NTF) events in high-end computer systems. Such a monitoring system can also avoid costly outages at customer sites and hence can reduce warranty and service costs for the computer vendor.

Such a monitoring system typically monitors a large number of signals from a computer system. One can divide these monitored signals into two categories: physical variables and soft variables. The physical variables may include distributed temperatures, voltages, and current through out the computer system. The soft variables may include time-series data related to system performance, such as throughput, queue lengths, transaction latencies, load metrics, and I/O metrics. An exemplary telemetry harness, for example, may collect over 25,000 soft variables in real time.

Figure 1:
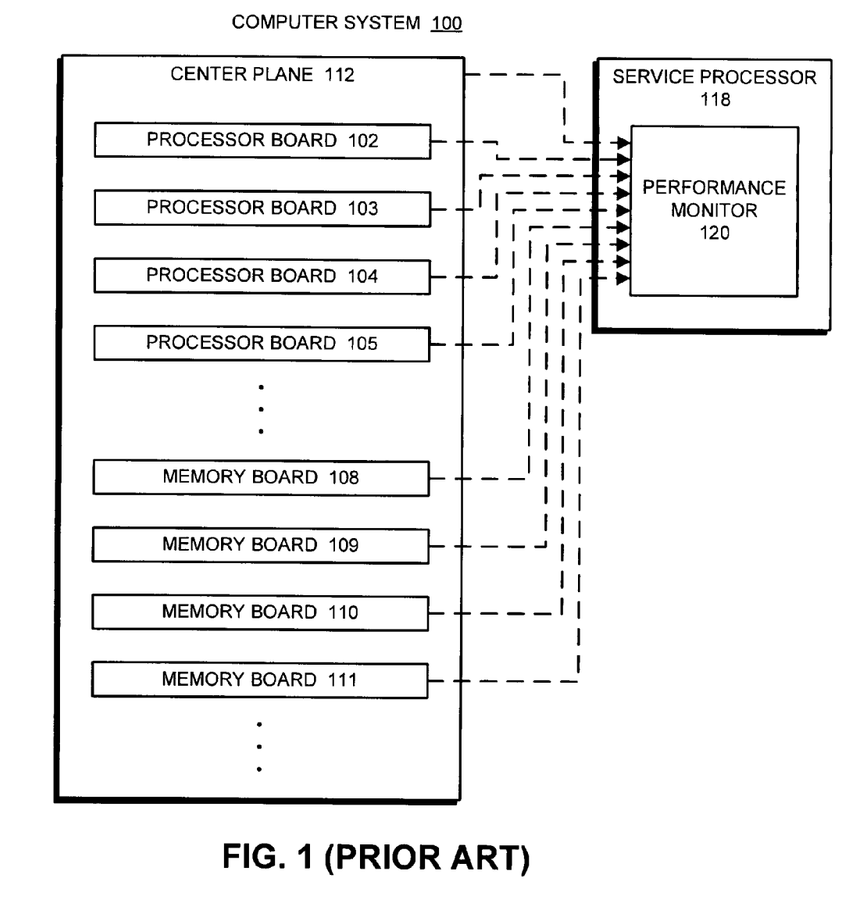
FIG. 1 illustrates a computer system which includes a service processor for processing telemetry signals.

FIG. 1 illustrates a computer system 100 which includes a service processor for processing telemetry signals. As is illustrated in FIG. 1, computer system 100 includes a number of processor boards 102-105 and a number of memory boards 108-111, which communicate with each other through center plane 112.

In the exemplary system shown in FIG. 1, system components are implemented as field replaceable units (FRUs), which are independently monitored. Note that all major system units, including both hardware and software, can be decomposed into FRUs. For example, a software FRU can include an operating system, a middleware component, a database, or an application.

Computer system 100 is associated with a service processor 118, which can reside within computer system 100, or alternatively can reside in a standalone unit separate from computer system 100. Within service processor 118, a performance monitor 120 receives telemetry signals from a number of sensors which report values of different variables, such as temperature, voltage, current, vibration, acoustics, etc. These telemetry signals may also include software-based performance parameters, such as processor load, memory/cache usage, system throughput, queue lengths, I/O traffic, quality of service, security, etc. Based on these received telemetry signals, service processor 118 performs a number of diagnostic functions for computer system 100 and determines whether computer system 100 or any of its components are in a degraded state. As is shown in FIG. 1, performance monitor 120 receives telemetry signals from center plane 112, processor boards 102-105, and memory boards 108-111. Alternatively, these performance-monitoring signals can traverse a network and reach a remote monitoring center (not shown).

Although the present invention is described in the context of a server computer system 100 with multiple processor boards and an associated service processor 118, the present invention is not meant to be limited to such a server computer system. In general, the present invention can be applied to any type of computer system, with or without a service processor 118. This includes, but is not limited to, a computer system based on a microprocessor, a mainframe computer, a digital signal processor, a portable computing device, a personal organizer, a device controller, and a computational engine within an appliance.

Telemetry Signal Clustering

In general, it is neither feasible nor desirable to monitor as many as 25,000 soft variables concurrently using pattern recognition techniques. This is because not all the signals are correlated with one another, and because the computational costs associated with analyzing a large number of un-correlated signals is prohibitively high.

Among the 25,000 variables, for example, many signals are uncorrelated with each other. On the other hand, there are clusters of signals, within which a high correlation exist between signals. However, correlations between signals belonging to different clusters are typically low. Because signals from disparate clusters are not closely correlated, pattern-recognition techniques, which derive information from correlations between signals, perform poorly when fed with streams of data from un-correlated signals.

Signal clustering also reduces computational costs. An exemplary pattern recognition system, for example, uses a nonlinear, nonparametric (NLNP) regression techniques. The computational costs of NLNP regression techniques typically increase linearly with the number of observations, but increase quadratically with the number of monitored signals. Hence, dividing N signals into M clusters can reduce computational costs substantially, because each cluster can be monitored separately.

An additional challenge in monitoring physical and soft variables from a computer system, is that many signals have time-varying phase shifts. This phenomenon arises because in a computer server running Unix/Linux/Solaris, individual processes can "speed up" or "slow down" with respect to one another over a period of time. One cannot, therefore, simply assume the relative timing between two signals to be in a steady state and compute a static cross-correlation coefficient for signal-clustering purposes.

One embodiment of the present invention finds a cluster or clusters of signals which are closely correlated with each other, by synchronizing the signals either offline or in real time. This approach attempts to first obtain a substantially optimal synchronization between any two signals, so that their cross-correlation coefficient is substantially maximized. The signals are then clustered based on their substantially maximized cross-correlation coefficients. In addition, the present invention facilitates subsequent synchronization of signals to compensate for phase-shift variations over time. The present invention performs these tasks by combining techniques based on graph theory, cross-correlation analysis, and numerical interpolation.

In one embodiment of the present invention, a cluster is represented by a tree structure, wherein each node of the tree represents a signal. The weight on an edge between two signals is the substantially maximized cross-correlation coefficient between the two corresponding signals subject to a phase-shift adjustment.

Figure 2:
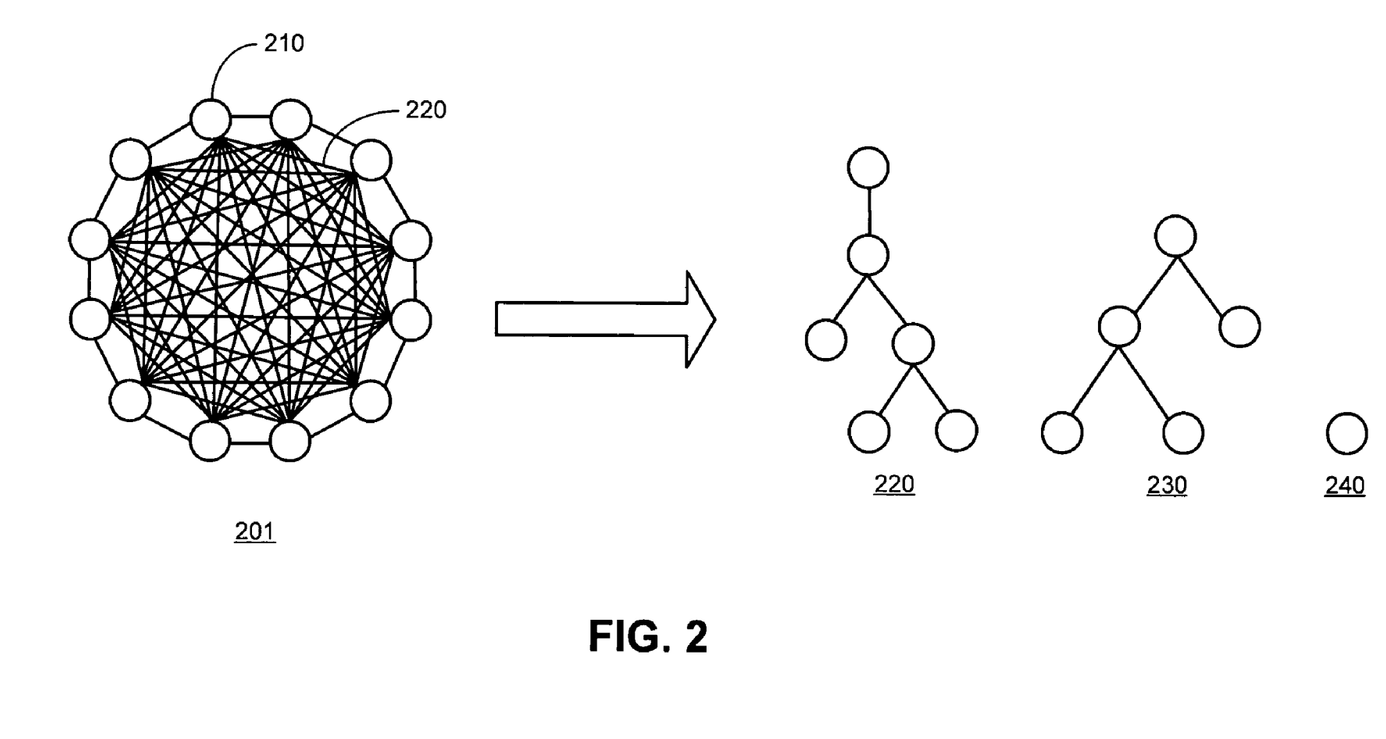
FIG. 2 illustrates the process of clustering monitored signals from a computer system in accordance with an embodiment of the present invention.

FIG. 2 illustrates the process of clustering monitored signals from a computer system in accordance with an embodiment of the present invention. As shown in FIG. 2, all the monitored signals from a computer system 201 are represented by nodes, such as node 210. The weight on an edge between two nodes, such as edge 220, is the substantially maximized cross-correlation coefficient between the two signals represented by the two nodes. In this way, one can construct a complete graph by computing the substantially maximized cross-correlation coefficient between all pairs of signals. The goal is to produce a number of signal clusters represented in trees, such as trees 220, 230, and 240. Within each of the clusters, the signals are closely correlated with each other.

A key component in the signal-clustering process is to construct maximum spanning trees, using a modified version of Kruskal's algorithm, from the initial complete graph as shown in FIG. 2. The resulting maximum spanning trees retain the largest-valued cross-correlation coefficients between signals. In addition, each maximum spanning tree is structured such that, for a specified threshold A, every non-root node has a substantially maximized cross-correlation coefficient larger than i1 with its parent.

Note that, after the signals are clustered, it is important to maintain synchronization within each cluster to facilitate pattern recognition for each cluster, because signals may drift out of synchronization over time.

Figure 3:
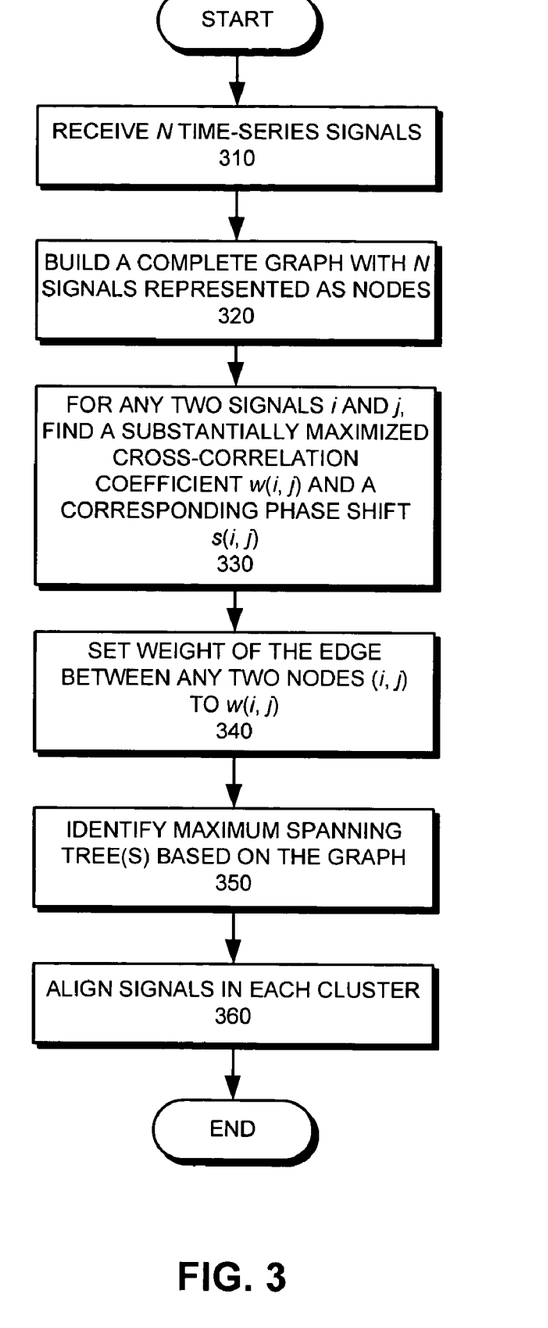
FIG. 3 presents a flow chart illustrating the process of clustering monitored signals from a computer system in accordance with an embodiment of the present invention.

FIG. 3 presents a flow chart illustrating the process of clustering monitored signals from a computer system in accordance with an embodiment of the present invention. The system starts by receiving N time-series signals (step 310). The system then builds a complete graph with N signals represented as nodes (step 320). Next, for any two signals i and j, the system finds a substantially maximized cross-correlation coefficient w(i,j), and a corresponding phase shift s(i,j) (step 330). The system then sets the weight on the edge between any two nodes (i,j) to w(i,j) (step 340). Based on the complete graph with weighted edges, the system identifies maximum spanning trees which represent signal clusters (step 350). After clustering the signals, the system aligns signals in each cluster to facilitate pattern recognition and to combat the signals' phase-shift variations over time (step 360).

Maximizing Cross-Correlation Coefficient Between Signals

Figure 4:
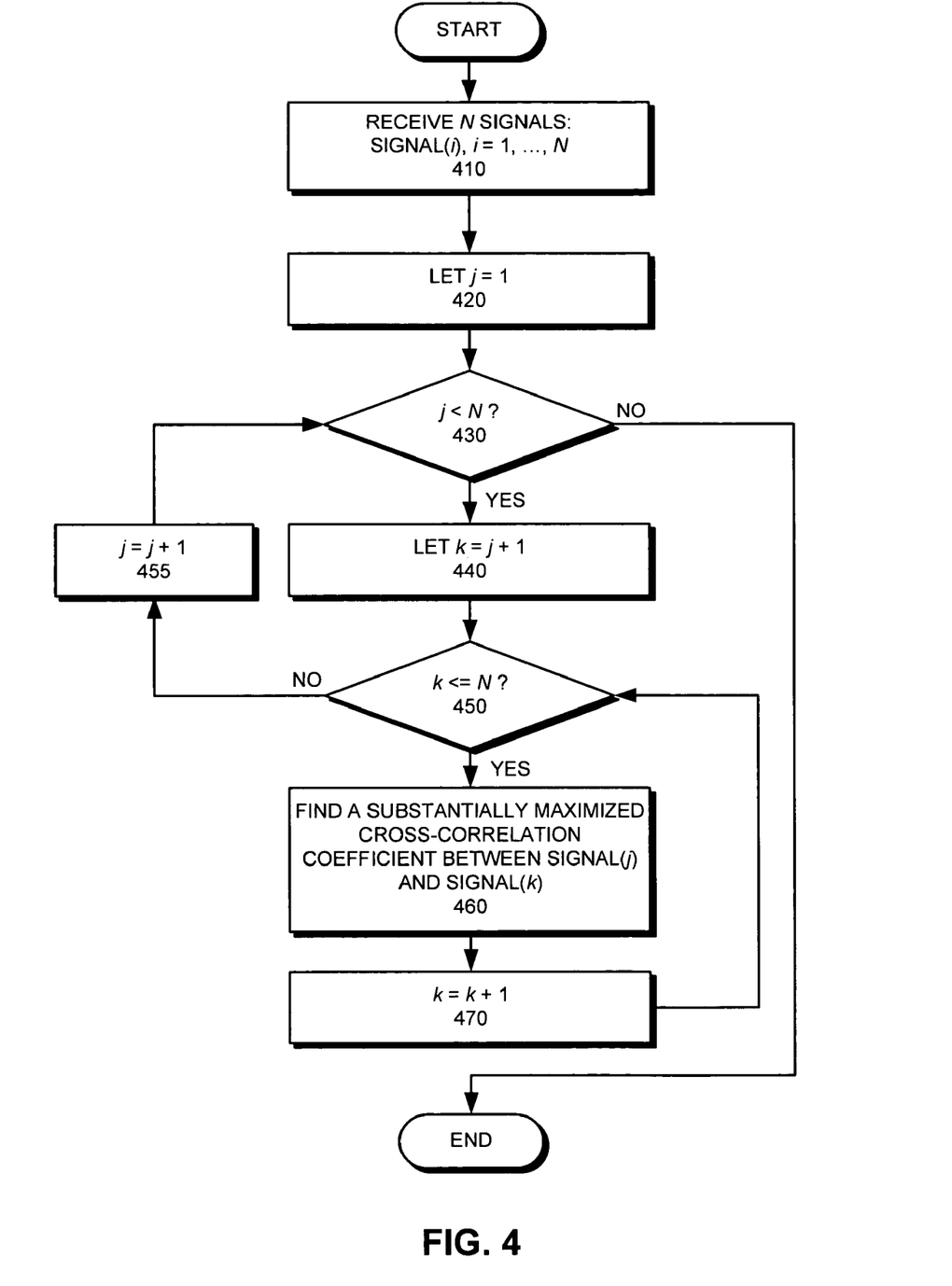
FIG. 4 presents a flow chart illustrating the process of computing a substantially maximized cross-correlation coefficient between any pair of signals in accordance with an embodiment of the present invention.

Finding a substantially maximized cross-correlation coefficient between two signals is an important step in determining edge weights in the complete graph. FIG. 4 presents a flow chart illustrating the process of computing a substantially maximized cross-correlation coefficient between any pair of signals in accordance with an embodiment of the present invention. In this process, the system considers all signal pairs by indexing all the signals, considering each individual signal in an increasing order based on the index numbers, and pairing an individual signal with other signals with a higher index number.

The system starts by receiving N signals: signal (i), i=1, . . . , N (step 410). The system then sets counter j=1 (step 420). Counter j represents the index number of the individual signal the process is considering. Next, the system determines whether j is less than N (step 430). If not, the system has finished considering all signal pairs and the process is complete. Otherwise, the system sets counter k=j+1 (step 440). Counter k represents the index number of a higher-indexed signal with which signal(j) is to be paired. The system then determines whether k is less than or equal to N (step 450). If not, the system has finished pairing signal(j) with all the higher-indexed signals, and is ready to increment counter j and to move on to signal(j+1) (step 455, and subsequently step 430). If k is less than or equal to N, the system finds the substantially maximized cross-correlation coefficient between signal(j) and signal(k) (step 460). The system then increments counter k by one (step 470), and repeats the pairing process (step 450).

Because each monitored signal from a computer system can fall out of synchronization with other signals, it is usually necessary to adjust the phase shift of one of the two signals in a pair to obtain a substantially optimal synchronization between the two signals. Since the discrete time-series signals from a computer system may or may not have a uniform sampling rate, the present invention first uses Lagrangian interpolation to "resample" a signal into a uniformly sampled time-series signal, so that the signal's timing can be shifted in arbitrary increments.

During the synchronization process, one of the two signals is fixed. The other signal's phase shift is then varied within a pre-determined window [−w/2, w/2]. For every step of phase shift, −w/2, −w/2+1, . . . , w/2, the system computes a corresponding cross-correlation coefficient. If the two signals under consideration are correlated, the resulting sequence of cross-correlation coefficients, when plotted with respect to the phase-shift values, traces out a curve that is typically concave downward with a maximum value.

Figure 5:
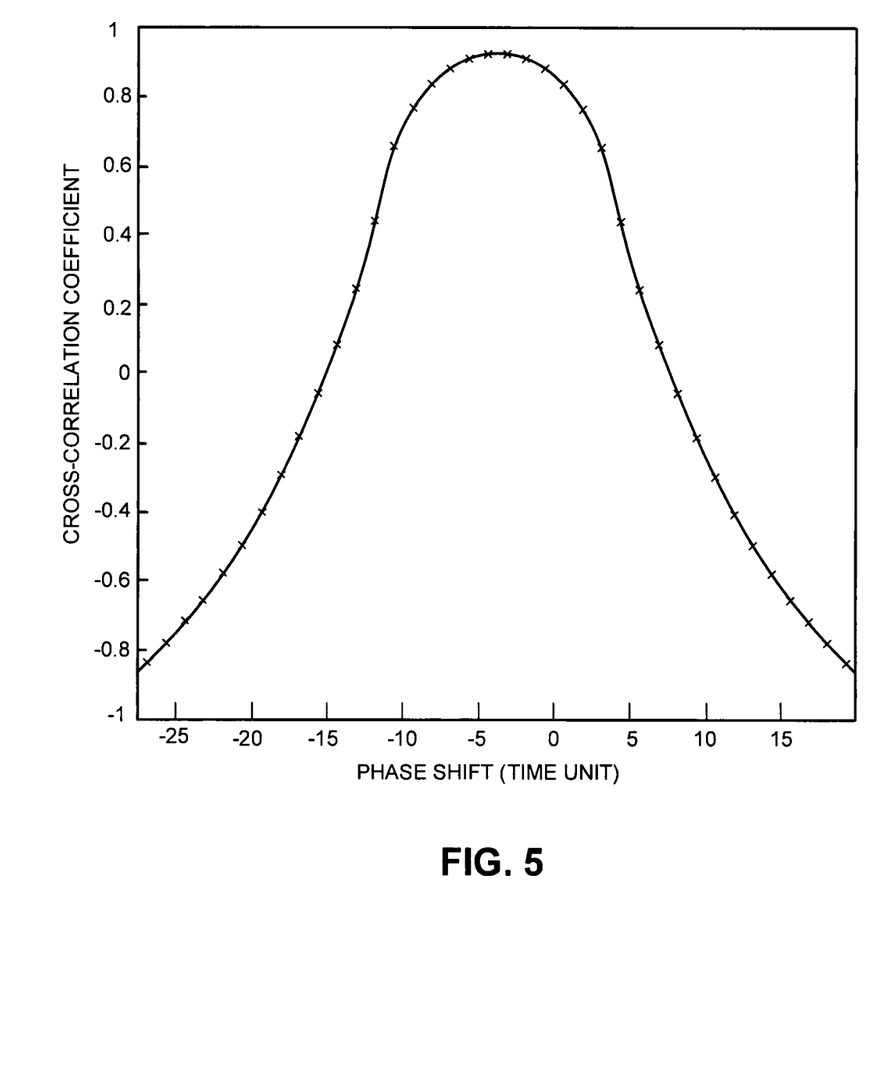
FIG. 5 illustrates an exemplary interpolation of cross-correlation coefficients with respect to relative phase shifts between two signals in accordance with an embodiment of the present invention.

In an attempt to find the maximum of the curve, the system may use an interpolation method, such as the Lagrangian interpolation method, to obtain a continuous plot of the cross-correlation coefficient as a function f of the relative phase shift between the two signals. FIG. 5 illustrates an exemplary interpolation of cross-correlation coefficients with respect to the relative phase shifts between two signals in accordance with an embodiment of the present invention. Based on the interpolation, the system computes the derivatives of the cross-correlation function at discrete points −w/2, w/2+1, . . . , w/2. This numerical differentiation step produces the values of f'(−w/2), f'(−w/2+1), . . . , f'(w/2). The system then performs an inverse Langrangian interpolation to find the value $\phi$ which yields f'($\phi$)=0. $\phi$ represents a substantially optimal phase shift between the two signals, and f($\phi$) is the substantially maximized cross-correlation coefficient between the two signals when they are substantially synchronized.

Figure 6:
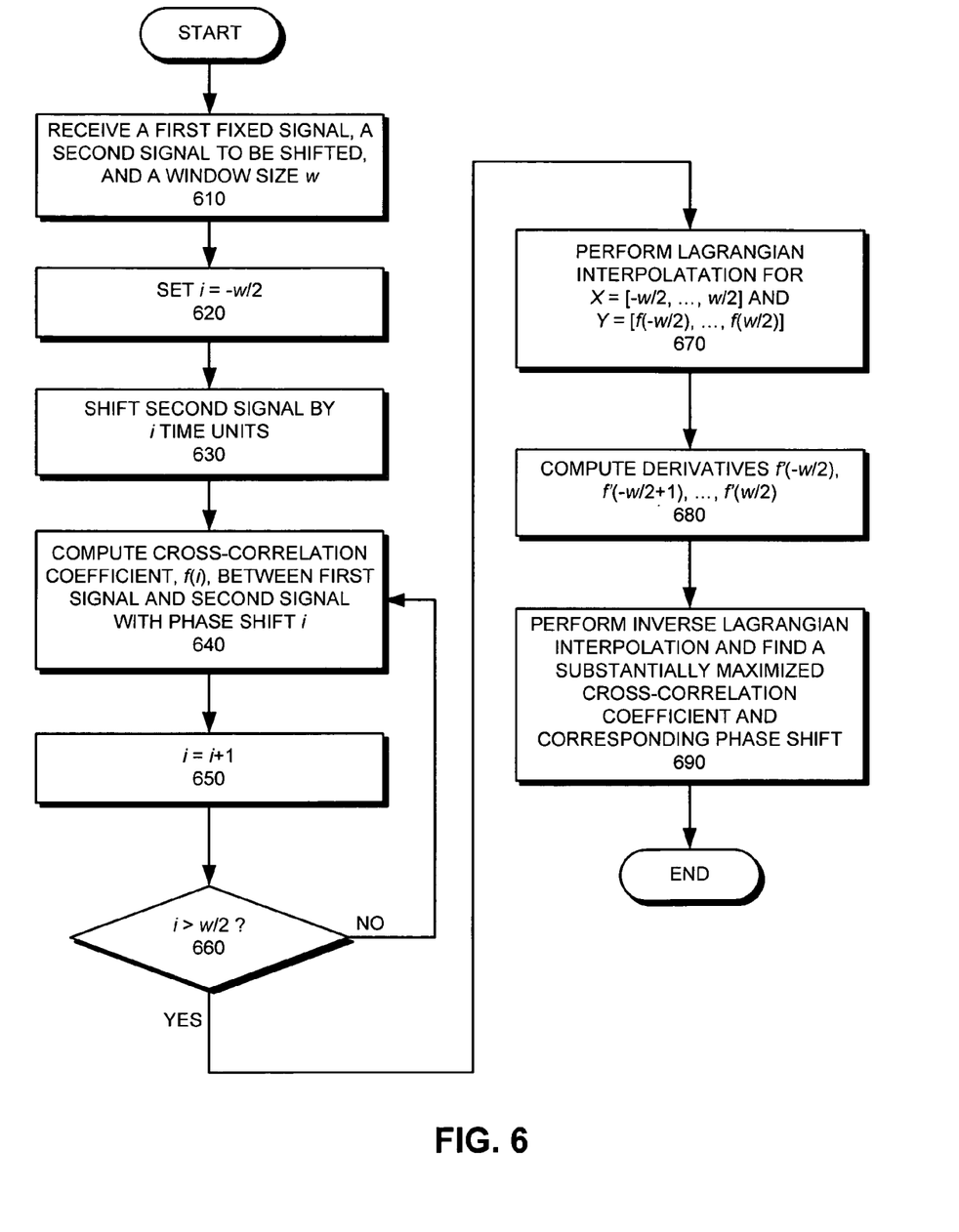
FIG. 6 presents a flow chart illustrating the process of synchronizing two signals in accordance with an embodiment of the present invention.

FIG. 6 presents a flow chart illustrating the process of synchronizing two signals in accordance with an embodiment of the present invention. The system starts by receiving a first fixed signal, a second signal to be shifted, and a window size w (step 610). The system then sets a phase-shift variable, i, to be −w/2 (step 620). Next, the system shifts the second signal by i time units (step 630). The system subsequently computes a cross-correlation coefficient, f(i), between the first signal and the second signal with a phase shift i (step 640). After incrementing i by one (step 650), the system determines whether i is greater than w/2 (step 660). If not, the system continues to compute the next cross-correlation coefficient with an incremented phase shift (step 640). Otherwise, the system performs a Lagrangian interpolation, wherein the X-axis values are [−w/2, −w/2+1, . . . , w/2], and the corresponding Y-axis values are [f(−w/2), f(−w/2+1), . . . , f(w/2)] (step 670). Next, the system computes the derivatives at the corresponding discrete phase-shift values: f'(−w/2), f'(−w/2+1), . . . , f'(w/2) (step 680). Finally, the system performs an inverse Lagrangian interpolation and finds the substantially maximized cross-correlation coefficient and the corresponding phase shift (step 690).

Finding Maximum Spanning Trees

Figure 7:
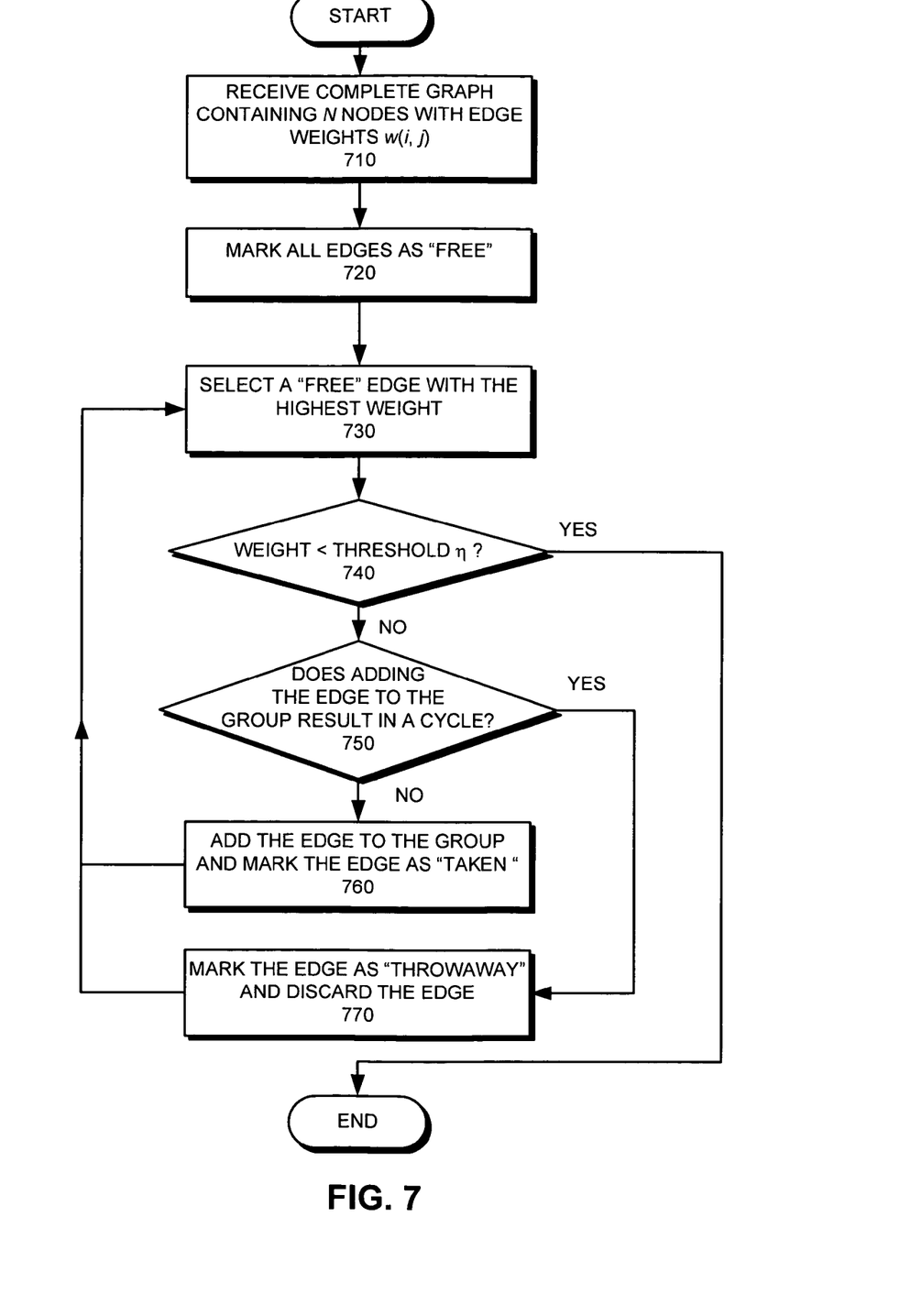
FIG. 7 presents a flow chart illustrating the process of constructing maximum spanning trees from a weighted graph in accordance with an embodiment of the present invention.

After the substantially maximized cross-correlation coefficients between any two signals have been found (and hence the weight of every edge in the complete graph as shown in FIG. 2 is determined), the system can now construct maximum spanning trees from the weighted complete graph. FIG. 7 presents a flow chart illustrating the process of constructing maximum spanning trees from a weighted graph in accordance with an embodiment of the present invention.

The system starts by receiving a complete graph containing N nodes, with edge weights w(i,j) (step 710). The system then marks all edges as "free" (step 720). Next, the system selects an edge with the highest weight among all the edges marked as "free" (step 730). The system subsequently determines whether the selected edge's weight is less than a given threshold $\eta$ (step 740). If so, all the remaining edges have weights less than the threshold, which indicates that the cross correlations between the signals represented by the nodes which are connected by these edges are negligibly small. At this point, the system exits.

If the selected edge's weight is greater than or equal to the threshold $\eta$, this edge becomes a candidate to be added in a group which contains edges comprising the maximum spanning trees. The system further determines whether adding the selected edge to the group results in any cycle within that group (step 750). (Note that, if an edge is added to the group, that edge becomes part of a maximum spanning tree.) If not, the system adds the edge to the group and marks the edge as "taken" (step 760). Otherwise, the system marks the edge as "throwaway" and discards the edge (step 770). The system then continues to examine the next "free" edge with the highest weight (step 730), until all the "free" edges left have weights less than the threshold $\eta$.

When the above-described procedure is complete, the resulting group contains edges which form one or more maximum spanning trees. Each maximum spanning tree is a cluster of signals. Within a spanning tree structure, a signal's cross-correlation coefficient with its parent signal is greater than the threshold $\eta$ (except for the root signal).

Synchronizing Signals within a Cluster

Once the signal clustering is complete, the system ideally synchronizes all the signals within a cluster to facilitate pattern recognition. It is important to specify a synchronization order to ensure that the synchronization process does not cause a loop. Otherwise, for example, if the system adjusts signal 1 to match the timing of signal 3, and if signal 2 is already adjusted to match the timing of signal 1, signal 2 would have to be adjusted again.

One way to specify a synchronization order for signals within a cluster, is to organize the signals in a tree structure. In fact, the maximum-spanning-tree structure obtained during the clustering process can be used here. The system can traverse a tree in either a depth-first or a breadth-first order, as long as the synchronization proceeds in one direction. When a node is visited, the synchronization process systematically leads and lags the corresponding signal in increments until the cross-correlation coefficient between the current signal and its parent signal is maximized. Given a cluster of n signals, the process performs n−1 timing adjustments by traversing the spanning tree.

Figure 8:
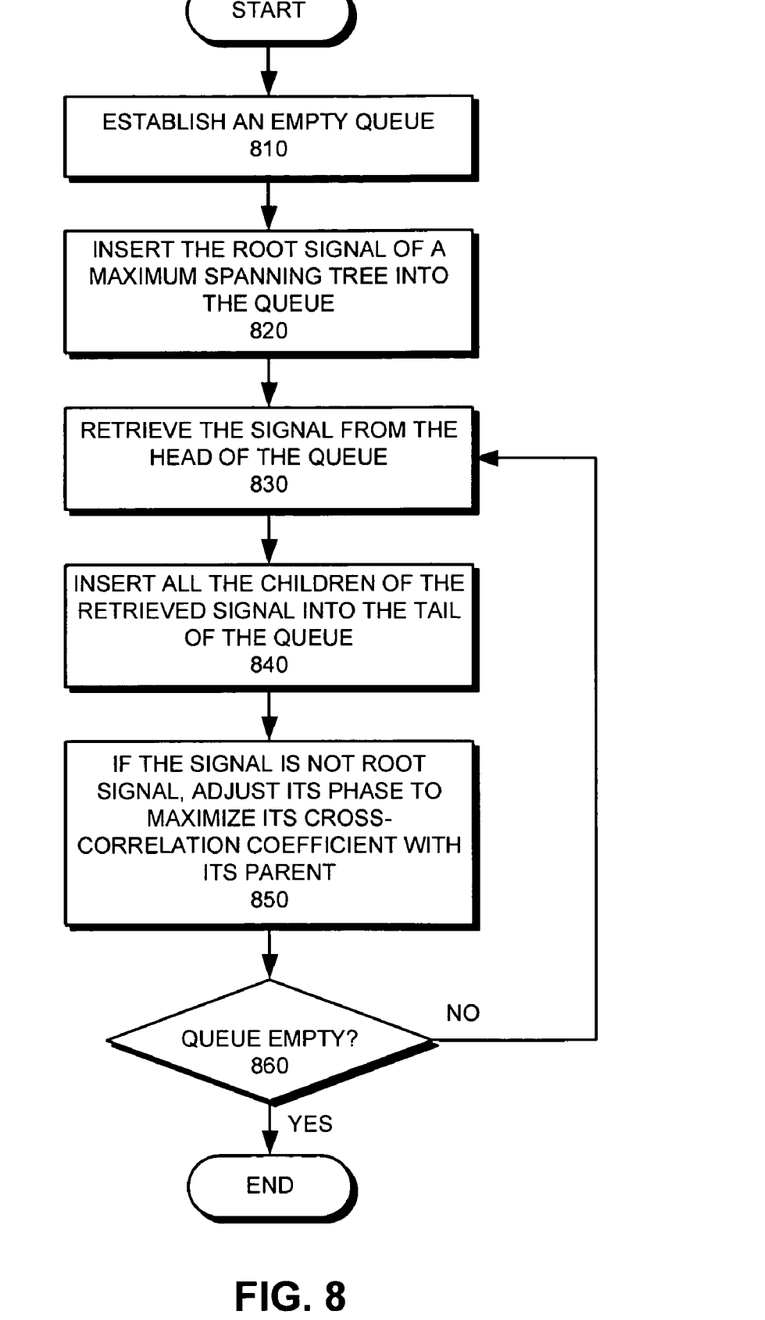
FIG. 8 presents a flow chart illustrating the process of synchronizing signals within a cluster by traversing the corresponding maximum spanning tree in a breadth-first order in accordance with an embodiment of the present invention.

FIG. 8 presents a flow chart illustrating the process of synchronizing signals within a cluster by traversing the corresponding maximum spanning tree in a breadth-first order in accordance with an embodiment of the present invention. The system starts by establishing an empty queue (step 810). The system then inserts the root signal of a maximum spanning tree into the queue (step 820). Next, the system retrieves the signal from the head of the queue (step 830). The system subsequently inserts all the children of the retrieved signal into the tail of the queue (step 840). If the signal is not the root signal, the system adjusts its timing to maximize its cross-correlation coefficient with its parent signal (step 850). The system then determines whether the queue is empty (step 860). If not, the system continues retrieving the next signal from the head of the queue (step 830). Otherwise, the synchronization process is complete.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for clustering signals to facilitate computer system monitoring, comprising:
    receiving monitored signals from a computer system;
    computing cross-correlation coefficients between the signals;
    grouping the signals into clusters based on the cross-correlation coefficients, wherein signals within a cluster are closely correlated;
    wherein grouping the signals into clusters involves forming a spanning-tree graph for each cluster of closely correlated signals;
        wherein each node in a graph represents a signal;
        wherein each edge in a graph represents a correlation between two signals;
        wherein a weight on an edge represents a substantially maximized cross-correlation coefficient between two signals; and
        wherein the substantially maximized cross-correlation coefficients represented by the weights of edges in each spanning-tree graph are greater than or equal to a threshold;
    monitoring signals within each cluster; and
    checking cross correlations between signals within each cluster to identify computer system anomalies.

2. The method of claim 1, wherein computing a cross-correlation coefficient between a first signal and a second signal involves:
    maximizing the cross-correlation coefficient with respect to a relative phase shift between the first signal and second signal by fixing the first signal; and
    by generating a phase shift for the second signal so that the cross correlation between the first signal and the second signal is substantially maximized.

3. The method of claim 2, wherein generating a phase shift for the second signal involves:
    imposing different phase shifts on the second signal;
    determining the cross-correlation coefficients between the first signal and the second signal at the different phase shifts;
    interpolating the cross-correlation coefficients with respect to the phase shift for the second signal; and
    finding the phase-shift value that corresponds to a substantially maximized cross-correlation coefficient.

4. The method of claim 3, wherein interpolating the cross-correlation coefficient involves performing a Lagrangian interpolation; and
    wherein finding the phase-shift value corresponding to the substantially maximized cross-correlation coefficient involves computing a derivative of the interpolated cross-correlation coefficient with respect to the phase shift of the second signal, and finding a phase-shift value which produces a substantially zero-valued derivative.

5. The method of claim 1, wherein forming a spanning-tree graph for each cluster of closely correlated signals involves:
    constructing a complete graph in which each node represents a signal;
    assigning a weight to each edge of the complete graph, wherein the weight corresponds to a substantially maximized cross-correlation coefficient between the two signals represented by the nodes connected by the edge;
    marking each edge as "free;"
    iteratively selecting among the "free" edges the edge with the highest weight and whose weight is greater than or equal to the threshold;
    if adding the selected edge to a group of edges which comprise one or more spanning tree graphs does not result in a cycle, adding the selected edge to the group and marking the selected edge as "taken;" otherwise, marking this selected edge as "throwaway" and discarding this selected edge; and
    stopping the iterative selection process if all the "free" edges have weights less than the threshold.

6. The method of claim 1, further comprising synchronizing the timing of all the signals within one cluster.

7. The method of claim 6, further comprising forming a tree graph for each cluster;
    wherein each node represents a signal;
    wherein each edge represents the correlation between two signals; and
    wherein synchronizing the timing of all the signals within one cluster involves synchronizing the timing of the signal represented by each node with the timing of the signal represented by the node's parent, except for the signal represented by the root node.

8. The method of claim 7, wherein synchronizing the timing of the signal represented by each node with the timing of the signal represented the node's parent involves traversing the spanning tree graph in a breadth-first manner or in a depth-first manner.

9. A computer-readable storage medium storing instructions that when executed by a computer cause the computer to perform a method for clustering signals to facilitate computer system monitoring, the method comprising:
    receiving monitored signals from a computer system;
    computing cross-correlation coefficients between the signals;
    grouping the signals into clusters based on the cross-correlation coefficients, wherein signals within a cluster are closely correlated;
    wherein grouping the signals into clusters involves forming a spanning-tree graph for each cluster of closely correlated signals;
        wherein each node in a graph represents a signal;
        wherein each edge in a graph represents a correlation between two signals; and
        wherein a weight on an edge represents a substantially maximized cross-correlation coefficient between two signals;
    monitoring signals within each cluster; and
    checking cross correlations between signals within each cluster to identify computer system anomalies.

10. The computer-readable storage medium of claim 9, wherein computing a cross-correlation coefficient between a first signal and a second signal involves:
    maximizing the cross-correlation coefficient with respect to a relative phase shift between the first signal and second signal by fixing the first signal; and
    by generating a phase shift for the second signal so that the cross correlation between the first signal and the second signal is substantially maximized.

11. The computer-readable storage medium of claim 10, wherein generating a phase shift for the second signal involves:

imposing different phase shifts on the second signal;
determining the cross-correlation coefficients between the first signal and the second signal at the different phase shifts;
interpolating the cross-correlation coefficients with respect to the phase shift for the second signal; and
finding the phase-shift value that corresponds to a substantially maximized cross-correlation coefficient.

12. The computer-readable storage medium of claim 11, wherein interpolating the cross-correlation coefficient involves performing a Lagrangian interpolation; and
wherein finding the phase-shift value corresponding to the substantially maximized cross-correlation coefficient involves computing a derivative of the interpolated cross-correlation coefficient with respect to the phase shift of the second signal, and finding a phase-shift value which produces a substantially zero-valued derivative.

13. The computer-readable storage medium of claim 10, wherein forming a spanning-tree graph for each cluster of closely correlated signals involves:
constructing a complete graph in which each node represents a signal;
assigning a weight to each edge of the complete graph, wherein the weight corresponds to a substantially maximized cross-correlation coefficient between the two signals represented by the nodes connected by the edge;
marking each edge as "free;"
iteratively selecting among the "free" edges the edge with the highest weight and whose weight is greater than or equal to the threshold;
if adding the selected edge to a group of edges which comprise one or more spanning tree graphs does not result in a cycle, adding the selected edge to the group and marking the selected edge as "taken;" otherwise, marking this selected edge as "throwaway" and discarding this selected edge; and
stopping the iterative selection process if all the "free" edges have weights less than the threshold.

14. The computer-readable storage medium of claim 9, wherein the method further comprises synchronizing the timing of all the signals within one cluster.

15. The computer-readable storage medium of claim 14 wherein the method further comprises forming a tree graph for each cluster;
wherein each node represents a signal;
wherein each edge represents the correlation between two signals; and
wherein synchronizing the timing of all the signals within one cluster involves synchronizing the timing of the signal represented by each node with the timing of the signal represented by the node's parent, except for the signal represented by the root node.

16. The computer-readable storage medium of claim 15, wherein synchronizing the timing of the signal represented by each node with the timing of the signal represented the node's parent involves traversing the spanning tree graph in a breadth-first manner or in a depth-first manner.

17. An apparatus for clustering signals to facilitate computer system monitoring, comprising:
a receiving mechanism configured to receive monitored signals from a computer system;
a signal-clustering mechanism configured to compute cross-correlation coefficients between the signals and to group the signals into clusters based on the cross-correlation coefficients, wherein signals within a cluster are closely correlated;
wherein while grouping the signals into clusters the signal-clustering mechanism is configured to form a spanning-tree graph for each cluster of closely correlated signals;
wherein each node represents in a graph a signal;
wherein each edge in a graph represents a correlation between two signals;
wherein a weight on an edge represents a substantially maximized cross-correlation coefficient between two signals; and
wherein the substantially maximized cross-correlation coefficients represented by the weights of edges in each spanning-tree graph are greater than or equal to a threshold; and
a monitoring mechanism configured to monitor signals within each cluster and to check cross correlations between signals within each cluster to identify computer system anomalies.

18. The apparatus of claim 17, wherein while computing a cross-correlation coefficient between a first signal and a second signal, the signal-clustering mechanism is configured to:
maximize the cross-correlation coefficient with respect to a relative phase shift between the first signal and second signal by fixing the first signal; and
by generating a phase shift for the second signal so that the cross correlation between the first signal and the second signal is substantially maximized.

19. The apparatus of claim 18, wherein while generating a phase shift for the second signal, the signal-clustering mechanism is configured to:
impose different phase shifts on the second signal;
determine the cross-correlation coefficients between the first signal and the second signal at the different phase shifts;
interpolate the cross-correlation coefficients with respect to the phase shift for the second signal; and
to find the phase-shift value that corresponds to a substantially maximized cross-correlation coefficient.

20. The apparatus of claim 19, wherein while interpolating the cross-correlation coefficient, the signal-clustering mechanism is configured to perform a Lagrangian interpolation; and
wherein while finding the phase-shift value corresponding to the substantially maximized cross-correlation coefficient, the signal-clustering mechanism is configured to compute a derivative of the interpolated cross-correlation coefficient with respect to the phase shift of the second signal, and to find a phase-shift value which produces a substantially zero-valued derivative.

21. The apparatus of claim 19, wherein while forming a spanning-tree graph for each cluster of closely correlated signals, the signal-clustering mechanism is configured to:
construct a complete graph in which each node represents a signal;
assign a weight to each edge of the complete graph, wherein the weight corresponds to a substantially maximized cross-correlation coefficient between the two signals represented by the nodes connected by the edge;
mark each edge as "free;"
select iteratively among the "free" edges the edge with the highest weight and whose weight is greater than or equal to the threshold;
if adding the selected edge to a group of edges which comprise one or more spanning tree graphs does not result in a cycle, add the selected edge to the group and mark the selected edge as "taken;" otherwise, mark this selected edge as "throwaway" and discard this selected edge; and to stop the iterative selection process if all the "free" edges have weights less than the threshold.

22. The apparatus of claim 17, further comprising a synchronization mechanism configured to synchronize the timing of all the signals within one cluster.

23. The apparatus of claim 22, wherein the synchronization mechanism is further configured to form a tree graph for each cluster;

wherein each node represents a signal;

wherein each edge represents the correlation between two signals; and wherein while synchronizing the timing of all the signals within one cluster, the synchronization mechanism is configured to synchronize the timing of the signal represented by each node with the timing of the signal represented by the node's parent, except for the signal represented by the root node.

24. The apparatus of claim 23, wherein while synchronizing the timing of the signal represented by each node with the timing of the signal represented the node's parent, the synchronization mechanism is configured to traverse the spanning tree graph in a breadth-first manner or in a depth-first manner.

* * * * *